United States Patent
Reid

(10) Patent No.: US 9,656,897 B2
(45) Date of Patent: May 23, 2017

(54) DUAL RETURN ACTIVATED SLUDGE PROCESS IN A FLOW-EQUALIZED WASTEWATER TREATMENT SYSTEM

(71) Applicant: John H. Reid, Fredericksburg, VA (US)

(72) Inventor: John H. Reid, Fredericksburg, VA (US)

(*) Notice: Subject to any disclaimer, the term of this patent is extended or adjusted under 35 U.S.C. 154(b) by 113 days.

(21) Appl. No.: 14/642,369

(22) Filed: Mar. 9, 2015

(65) Prior Publication Data

US 2016/0200615 A1    Jul. 14, 2016

Related U.S. Application Data

(63) Continuation-in-part of application No. 14/593,508, filed on Jan. 9, 2015.

(51) Int. Cl.
  *C02F 11/04*    (2006.01)
  *C02F 3/30*    (2006.01)
  *C02F 3/22*    (2006.01)

(52) U.S. Cl.
  CPC ........... *C02F 11/04* (2013.01); *C02F 3/307* (2013.01); *C02F 3/22* (2013.01); *C02F 3/303* (2013.01); *C02F 2209/10* (2013.01); *C02F 2209/40* (2013.01); *C02F 2301/043* (2013.01); *Y02W 10/15* (2015.05)

(58) Field of Classification Search
  CPC .. C02F 11/04; C02F 3/22; C02F 3/303; C02F 2209/10; C02F 2209/40; C02F 2209/043; C02F 2209/2301

USPC ............... 210/605, 621, 622, 623, 630, 903
See application file for complete search history.

(56) References Cited

U.S. PATENT DOCUMENTS

| | | | |
|---|---|---|---|
| 7,722,768 B2 | 5/2010 | Abma et al. | |
| 8,574,885 B2 | 11/2013 | Vanotti et al. | |
| 2002/0074287 A1* | 6/2002 | Park .................. | C02F 3/302 210/605 |
| 2013/0327710 A1 | 12/2013 | Reid | |
| 2014/0238931 A1 | 8/2014 | DiMassimo et al. | |

* cited by examiner

*Primary Examiner* — Fred Prince
(74) *Attorney, Agent, or Firm* — Walter Ottesen, P.A.

(57) ABSTRACT

A common final clarifier is provided downstream of a two-stage activated sludge (AS) system that includes a flow equalization basin (FEB) reactor and a nitritation reactor as the first AS stage and an anammox reactor as the second AS stage. A first return activated sludge (RAS) flow is conducted from the final clarifier to the first AS stage with a low flow rate and a second segregated RAS flow is conducted to the second AS stage with a high flow rate. The FEB reactor is operated as an anoxic reactor to achieve carbonaceous BOD removal; conversion of organic nitrogen to ammonia nitrogen; and, denitrification of recycled nitrite or nitrate nitrogen. The nitritation reactor is operated as an aerobic reactor to achieve oxidation of ammonia nitrogen to nitrite nitrogen by biological nitritation. The anammox reactor is operated at zero or very low dissolved oxygen concentration to achieve nitrogen removal by deammonification.

20 Claims, 5 Drawing Sheets

DUAL RETURN ACTIVATED SLUDGE PROCESS IN A FLOW-EQUALIZED WASTEWATER TREATMENT SYSTEM

CROSS REFERENCE TO RELATED APPLICATION

This application is a continuation-in-part of U.S. patent application Ser. No. 14/593,508, filed Jan. 9, 2015, the entire content of which is incorporated herein by reference.

FIELD OF THE DISCLOSURE

A two-stage activated sludge (AS) wastewater treatment system is disclosed in which the first stage includes a flow equalization basin (FEB) reactor and a nitritation reactor and the second stage includes an anammox reactor. The FEB reactor provides flow equalization of the wastewater or sewage influent. A common final clarifier is arranged downstream of the second AS stage.

BACKGROUND

It is known from US2013/0327710 to mix the outflow of sequential treatment zones in an anaerobic lagoon or tank design to achieve improved carbon to nitrogen ratio control of the effluent. The anaerobic lagoon or tank produces a blended wastewater or sewage mixture with an adequately high carbon to nitrogen ratio for a downstream activated sludge treatment process to achieve enhanced nitrogen removal by nitrification-denitrification.

Bacteria mediating the direct conversion of nitrite and ammonium into nitrogen gas by the anaerobic ammonium oxidation (anammox) process are used for deammonification of wastewater without the intermediate production of nitrate. However, dissolved oxygen (DO) concentrations of more than 0.2 mg/L are known to inhibit the anammox process.

Significant challenges remain in the treatment of industrial wastewater or municipal sewage based on the variability of pollutant concentrations, volume, and temperature of the influent into a treatment facility.

SUMMARY OF THE DISCLOSURE

Disclosed herein is a process for operating a two-stage activated sludge wastewater or sewage treatment system in which a dual RAS flow is provided such that a first RAS flow is conducted from a common downstream final clarifier to the first AS stage with a low flow rate and a second RAS flow is conducted from the final clarifier to the second AS stage with a high flow rate.

In particular, a process is disclosed which comprises receiving a wastewater inflow or a sewage inflow in a flow equalization reactor, receiving an outflow from the flow equalization reactor in a nitritation reactor, receiving an overflow of partially treated wastewater or partially treated sewage from the nitritation reactor in an anammox reactor, receiving a bypass flow from the flow equalization reactor in the anammox reactor, receiving a mixed liquor flow from the anammox reactor in a clarifier, providing a first return activated sludge flow from the clarifier to the flow equalization reactor, the nitritation reactor or to the flow equalization reactor and to the nitritation reactor, and providing a second return activated sludge flow from the clarifier to the anammox reactor.

BRIEF DESCRIPTION OF THE DRAWINGS

The disclosure will now be described with reference to the drawings wherein.

DESCRIPTION OF THE BEST AND VARIOUS EMBODIMENTS

Figure 1:
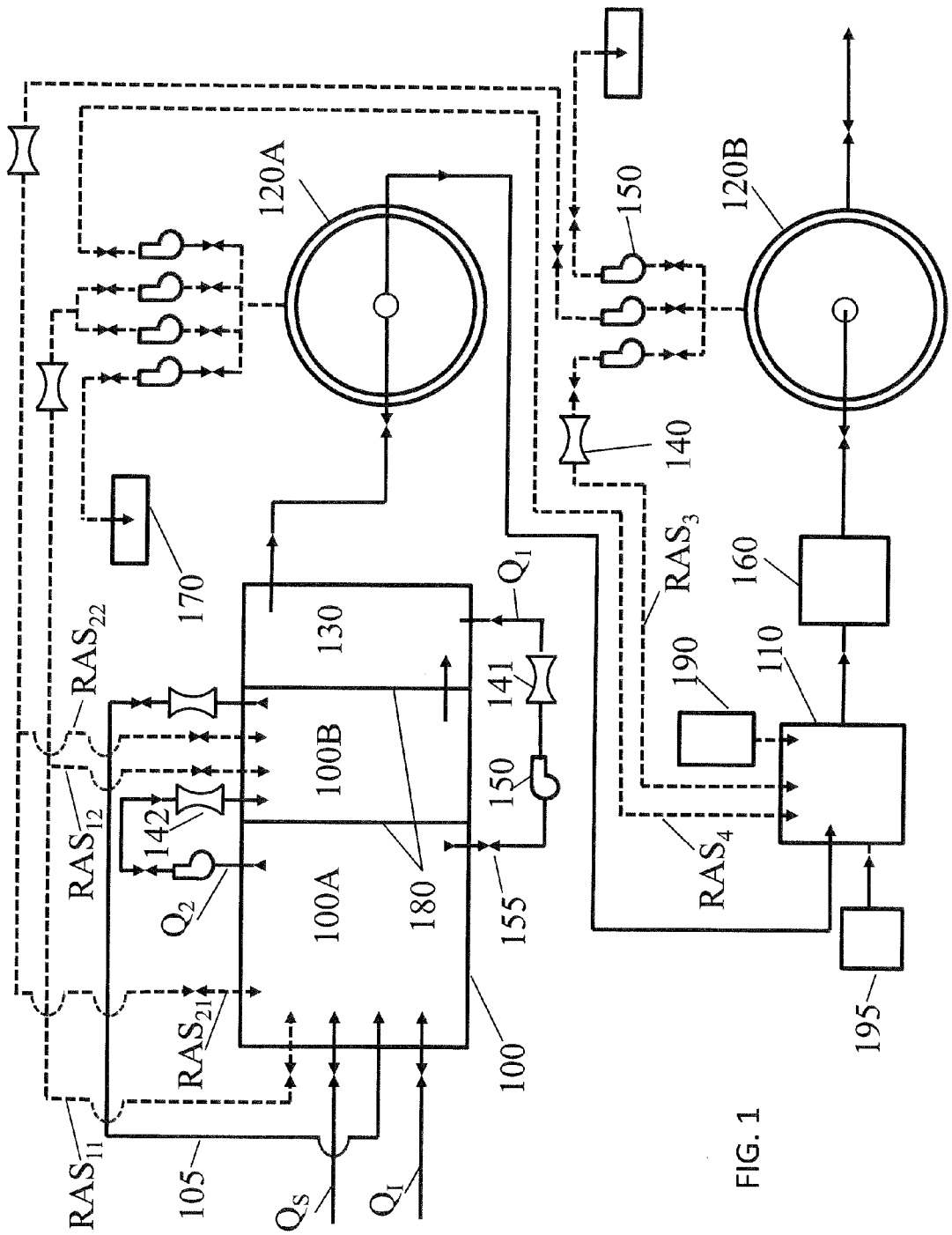
FIG. 1 shows a schematic overview of the treatment process in which a third stage anammox reactor 110 receives a mixture of a wastewater inflow from clarifier 120A.

The foregoing and other objects, aspects, and advantages of the disclosure will be better understood from the following detailed description of the best and various embodiments. Throughout the various views and illustrative embodiments of the present disclosure, like reference numbers are used to designate like elements.

In a typical embodiment, the mixed liquor flow from the anammox reactor is received in a plurality of clarifiers that are operated in parallel. Throughout this disclosure, a plurality means two or more.

In another typical embodiment, the bypass flow from the flow equalization reactor and the outflow from the nitritation reactor are blended in the anammox reactor. In yet another typical embodiment, the mean cell residence time (MCRT) of the flow equalization reactor, the nitritation reactor or the equalization reactor and the nitritation reactor is adjusted to be of from 2 to 5 days.

In a particular embodiment, the MCRT of the anammox reactor is adjusted to be of from 40 to 60 days. With particularity, the MCRT of the anammox reactor is adjusted to be approximately 50 days. Throughout this disclosure, approximately means that a value can vary by ±10%.

Typically, the outflow from the flow equalization reactor into the nitritation reactor is provided with an average flow rate of from 40% to 50% of an average daily feed forward flow rate. More typically, the average daily flow rate of the outflow is 45% of the average daily feed forward flow rate.

In a typical embodiment, the bypass flow from the flow equalization reactor into the annamox reactor is received with an average flow rate of from 50% to 60% of the average daily feed forward flow rate. In particular, the average daily flow rate of the bypass flow is 55% of the average daily feed forward flow rate.

In a particular embodiment, the flow equalization reactor is operated with a dissolved oxygen concentration of approximately 0.0 mg/L to 0.10 mg/L. In another particular embodiment, the nitritation reactor is operated with a dissolved oxygen concentration of approximately 0.10 mg/L to 0.30 mg/L. In yet another typical embodiment, the anammox reactor is operated with a dissolved oxygen concentration of approximately 0.0 mg/L to 0.10 mg/L.

With particularity, at least one polishing reactor is provided between the annamox reactor and the clarifier. Also with particularity, a plurality of polishing reactors connected in series is provided between the annamox reactor and the clarifier. In a further particular embodiment, a plurality of polishing reactors connected in series followed by a plurality of clarifiers connected in parallel are provided downstream of the anammox reactor.

In a typical embodiment, the polishing reactor removes residual ammonia from the mixed liquor flow by nitrification. In another typical embodiment, the polishing reactor removes residual nitrate nitrogen from the mixed liquor flow by denitrification. In yet another typical embodiment, two polishing reactors are connected in series, wherein the first polishing reactor removes residual ammonia and the second polishing reactor removes residual nitrate nitrogen.

With particularity, the flow rate of the second return activated sludge flow from the clarifier to the second AS stage is greater than the flow rate of the first return activated sludge flow to the first AS stage.

In a particular embodiment, the concentration of mixed liquor suspended solids (MLSS) in the flow equalization reactor, the nitritation reactor or in the flow equalization reactor and the nitritation reactor is of from 500 mg/L to 1,500 mg/L. In another particular embodiment, the concentration of MLSS in the anammox reactor is of from 2,000 mg/L to 6,000 mg/L.

In a typical embodiment, the mixed liquor flow is treated in a first clarifier 120A before being received in the anammox reactor. In another typical embodiment, an outflow of the anammox reactor is treated in a second clarifier 120B. In yet another typical embodiment, a nitrite recycle flow 105 is conducted from the nitritation reactor into the flow equalization reactor.

In a particular embodiment, the wastewater inflow is a liquor selected from the group consisting of a digester supernatant, a sludge dewatering filtrate, an influent screened raw sewage, and a primary clarifier effluent, or a mixture thereof. In another particular embodiment, anammox biomass is recycled from the second clarifier 120B to the anammox reactor. In yet another particular embodiment, aerobic ammonium oxidizing biomass is recycled from the first clarifier 120A to at least one of the equalization reactor 100A and the nitritation reactor 100B.

With particularity, an average daily flow rate of the nitrite recycle flow is of from 100% to 1,000% of the average daily mixed liquor flow. Also with particularity, the average daily flow (ADF) rate of the nitrite recycle flow is 200% to 400% of the average daily throughput wastewater flow volume.

In a particular embodiment, the equalization reactor has an average total daily inflow rate, wherein an average daily flow rate of the mixed liquor bypass flow $Q_1$ is of from 50% to 60% of the average total inflow rate, and wherein an average daily flow rate of the wastewater flow $Q_2$ is of from 40% to 50% of the average total inflow rate. In another particular embodiment, the average daily flow rate of the mixed liquor bypass flow $Q_1$ is 55% of the average total inflow rate and the average daily flow rate of the wastewater flow $Q_2$ is 45% of the average total inflow rate. In yet another particular embodiment, the equalization reactor is operated with a dissolved oxygen concentration of approximately 0.0 mg/L.

In a typical embodiment, the aerobic ammonium oxidizing biomass is recycled from clarifier 120A in return activated sludge flow $RAS_{11}$ and/or $RAS_{12}$ with a flow rate of from 50% to 150% of the average daily throughput flow volume. In another typical embodiment, a combined sludge retention time of biomass sludge in the equalization reactor plus nitritation reactor is selected to be approximately 1 to 4 days, more typically about 3 days. In yet another typical embodiment, a sludge retention time of biomass sludge in the anammox reactor is selected to be of from 40 to 60 days, more typically about 50 days.

With particularity, the nitritation reactor is operated with a dissolved oxygen concentration of approximately 0.10 to 0.40 mg/L, more particularly 0.20 mg/L. Also with particularity, the anammox reactor is operated with a dissolved oxygen concentration of from 0.0 mg/L to approximately 0.10 mg/L.

A hypochlorite solution, a hydrogen peroxide solution or peracetic acid solution can be optionally added to the nitritation reactor 100B to inhibit the growth and accumulation of nitrite oxidizing biomass (NOB) and the production of nitrate nitrogen in the first and second stage reactor-clarifier system. Also, surface aeration can be optionally used in the nitritation reactor to reduce the mixed liquor temperature in order to inhibit the growth of nitrite oxidizing bacteria.

Turning to the drawings, FIG. 1 shows a wastewater treatment system 100, which is divided into three treatment zones 100A, 100B, and flocculation tank 130 by separator walls 180. The first treatment zone is operated as a flow equalization reactor (EQ reactor) to equalize diurnal flow variations, stormwater flow surges, and spikes in the influent wastewater flow; to mix and blend various influent wastewater sources such as screened and degritted raw sewage $Q_I$, high strength sludge digester process supernatant wastewater $Q_S$, and/or sludge dewatering process filtrate wastewater and filter backwash wastewater. Further, the first treatment zone 100A provides a first stage activated sludge treatment for carbonaceous biological oxygen demand (BOD) removal by anoxic heterotrophic biomass (AHB) using nitrite or nitrate nitrogen contained in mixed liquor of nitrite recycle flow (NiR) 105 recycled from the downstream second stage aerobic nitritation reactor 100B as an oxygen source.

From the equalization reactor 100A, mixed liquor containing partially treated wastewater or sewage is pumped with pump 150 through valve 155 as by-pass flow $Q_1$ to flocculation tank 130, which is operated as a mixer cell. Further, a second flow of partially treated wastewater or sewage $Q_2$ is pumped directly to the nitritation reactor 100B. The flow rates $Q_1$ and $Q_2$ are measured using flow meters 141 and 142, respectively. An overflow 230 of mixed liquor from the nitritation reactor is also received in the flocculation tank 130, which combines and mixes the by-pass mixed liquor flow from the equalization reactor and the mixed liquor overflow from the nitritation reactor. After mixed liquor suspended solids are settled in first clarifier 120A, the clarifier overflow is conducted to anammox reactor 110 for treatment by anammox bacteria. Optionally, two or more clarifiers 120A may be operated in parallel.

From first clarifier 120A one or more return activated sludge (RAS) flows may be provided. In particular, $RAS_{11}$ line returns activated sludge to the equalization reactor 100A and $RAS_{12}$ returns activated sludge to the nitritation reactor 100B. Further, activated sludge can be pumped from the first clarifier 120A through line $RAS_4$ to the anammox reactor 110 and a return activated sludge flow can be provided from second clarifier 120B to anammox reactor 110 using return activated sludge line $RAS_3$. In addition, return activated sludge line $RAS_{21}$ is provided for returning activated sludge from second clarifier 120B to equalization reactor 100A and $RAS_{22}$ is provided for returning activated sludge from second clarifier 120B to nitritation reactor 100B. The flow rate is measured using flow meter 140.

A mixed liquor outflow from anammox reactor 110 is conducted to flocculation tank 160 and subsequently into second clarifier 120B. Optionally, two or more clarifiers 120B may be operated in parallel.

Excess sludge can be collected and discarded using waste activated sludge tank 170. Optionally, a carbon source from carbon source container 190 may be added to anammox reactor 110 to assist in removal of any nitrate nitrogen that might be present in the clarifier 120B overflow wastewater. Typical carbon source solutions are, for example, methanol, high quality waste glycerin, sugar-based waste products, and acetic acid or a mixture thereof.

Anammox reactor 110 can optionally be maintained at a temperature between 20° C. and 30° C. by providing heat using heat source 195. The heat source can be a steam injector, one or more dry heating elements, or a heat exchanger unit through which a mixed liquor flow is recirculated.

The equalization reactor 100A is operated at approximately 0.0 (zero) dissolved oxygen (DO) concentration with nitrite recycle influent flow, and, with or without return activated sludge (RAS) influent flow. A continuous mixed liquor recycle flow rate of 100% to 1000% (400% average) designated as the nitrite recycle (NiR) Flow Rate 105 is provided from the nitritation reactor 100B back into the equalization reactor 100A. An RAS rate of 50% to 150% is typically used from the downstream clarifier for the RAS flows $RAS_{11}$ and $RAS_{12}$ to the equalization reactor and/or the nitritation reactor.

Figure 2:
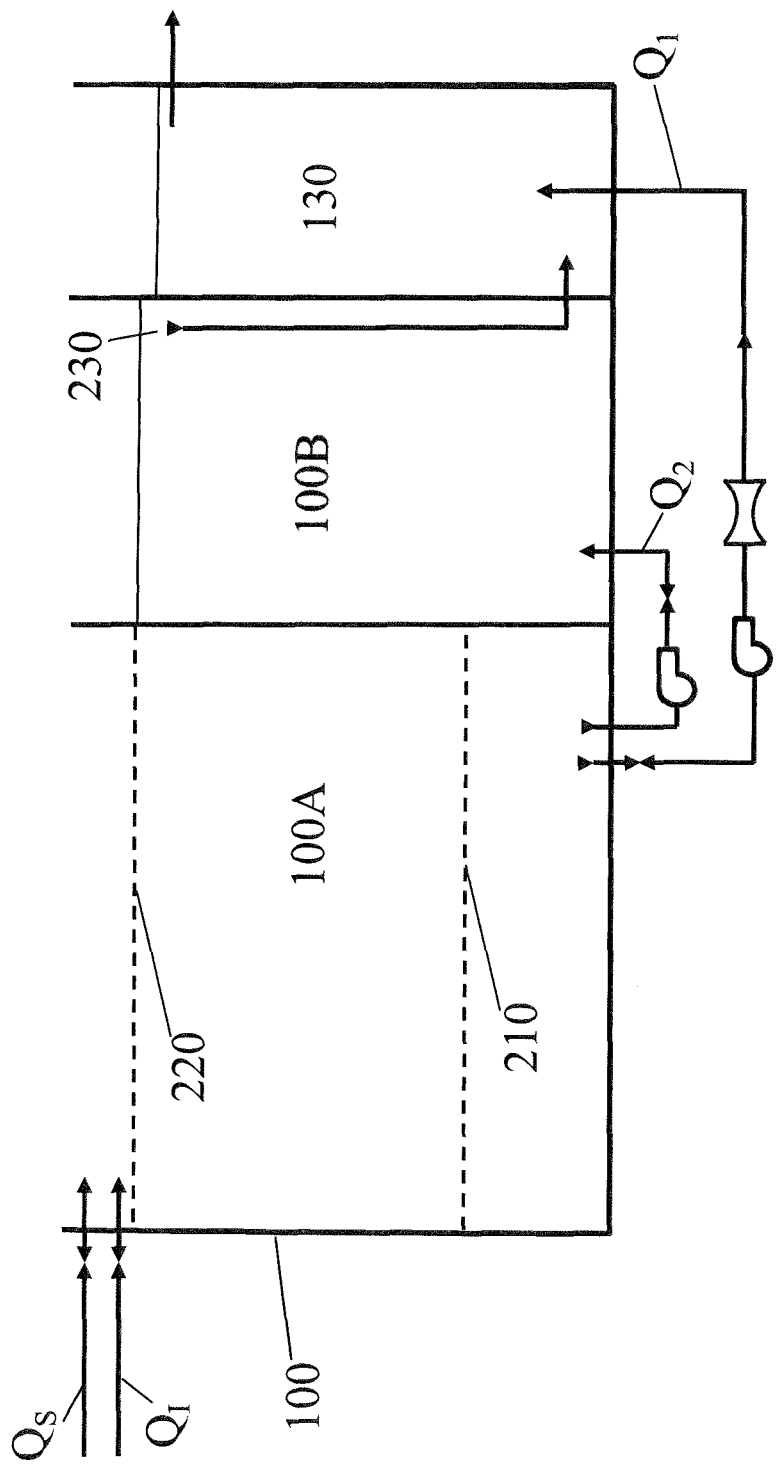
FIG. 2 shows a sideview of equalization reactor 100 with one or more treatment zones wherein a wastewater fill level within the reactor 100 is maintained between low level mark 210 and high level mark 220.

FIG. 2 shows a side view of wastewater treatment system 100. The combined inflow into the equalization reactor 100A is equalized such that a fill height of wastewater or sewage in the reactor is maintained between low level mark 210 and high level mark 220 where the inflow undergoes partial treatment. After the partial treatment, an outflow $Q_2$ is received in nitritation reactor 100B. The flow rates of flows $Q_1$ and $Q_2$ leaving the equalization reactor can be constant or substantially constant. An overflow 230 is collected in flocculation tank 130. Mixed liquor overflow 230 and mixed liquor by-pass flow $Q_1$ are mixed in flocculation tank 130 before being conducted to clarifier 120A for biomass sedimentation.

Figure 3:
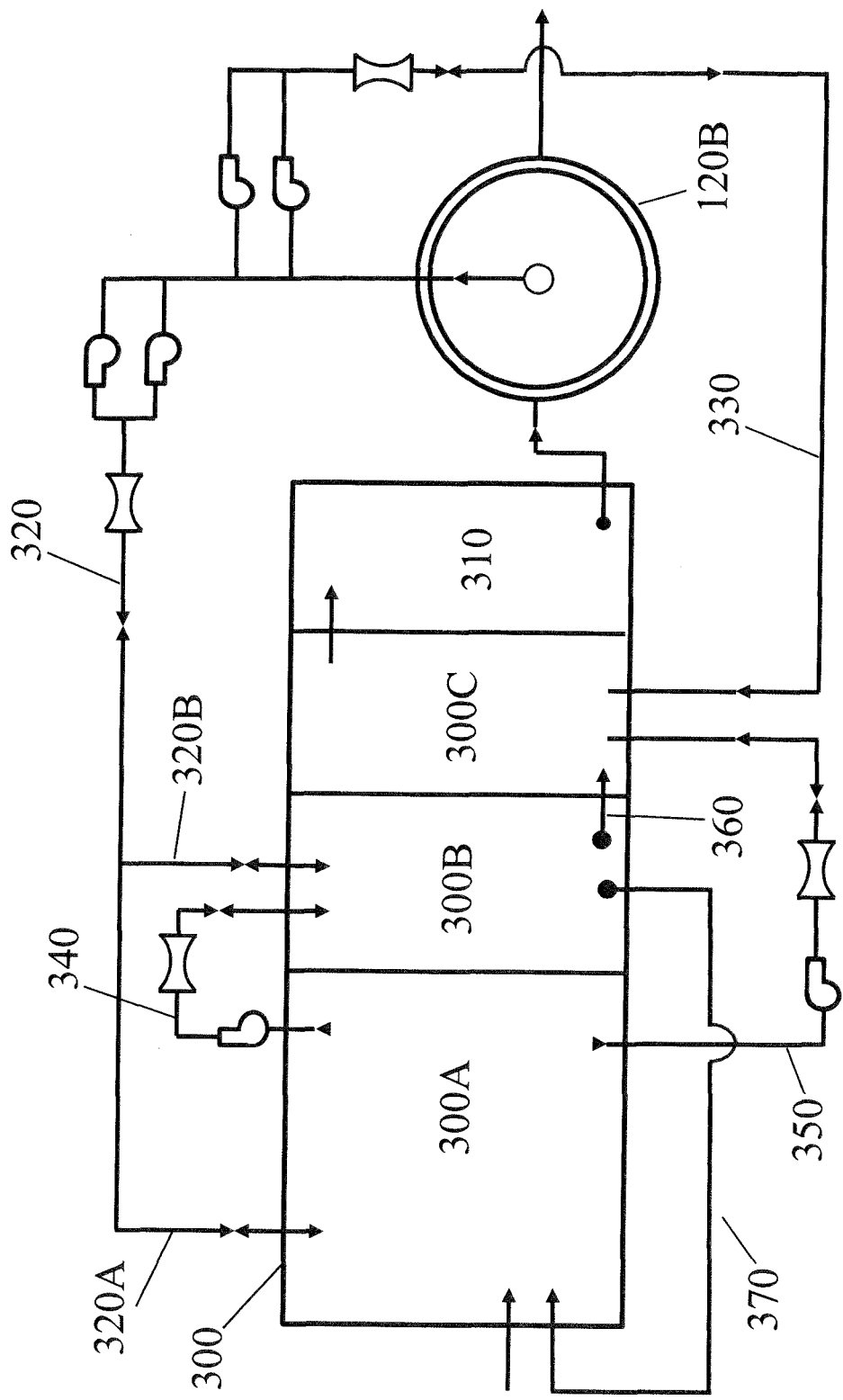
FIG. 3 shows a two-stage RAS wastewater treatment system 300 with a dual RAS flow system for adjusting the return flow rates separately.

FIG. 3 shows a two-stage activated sludge wastewater treatment system 300 with a dual RAS flow system. A first return line 320 returns activated sludge from the clarifier to the first AS stage. In particular, return line 320 provides a RAS flow to the flow equalization reactor 300A via segment 320A and/or the nitritation reactor 300B via segment 320B. Further, a RAS return flow is provided for returning activated sludge from the clarifier to anammox reactor 300C, i.e., the second AS stage, via return line 330. The return flow rates through return lines 320 and 330 is adjusted separately for the first AS stage and the second AS stage.

Figure 4:
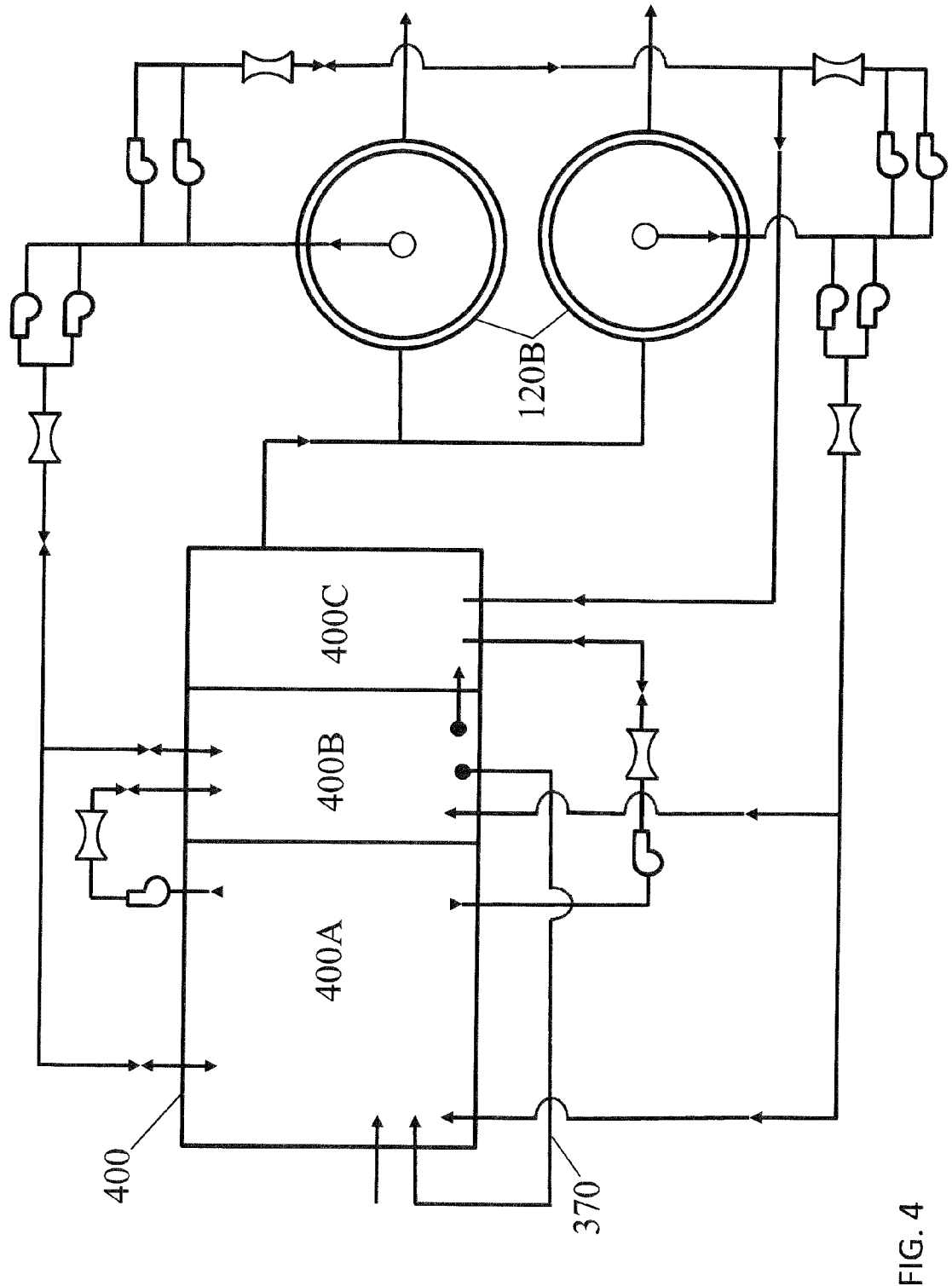
FIG. 4 shows a two-stage RAS wastewater treatment system 400 in which two final clarifiers are connected in parallel; and, FIG. 5 shows a two-stage RAS wastewater treatment system 500 in which two polishing reactors are connected in series upstream of first clarifier 120A.
Figure 5:
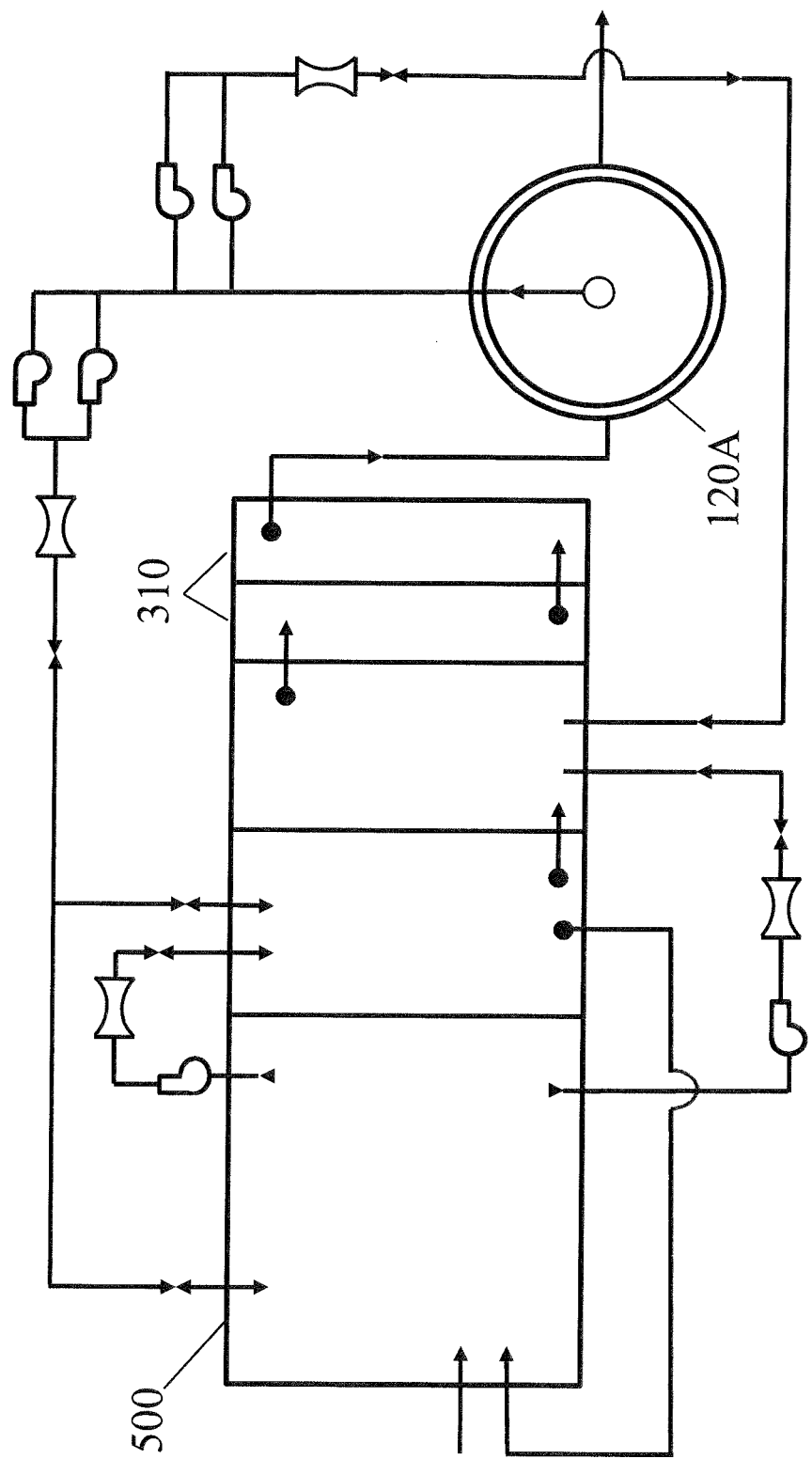

FIG. 4 shows a two-stage AS wastewater treatment system 400 containing an FEB reactor 400A, a nitritation reactor 400B, and an anammox reactor 400C, in which two final clarifiers are connected in parallel; and, FIG. 5 shows a two-stage AS wastewater treatment system 500 in which two polishing reactors 310 are connected in series.

The final activated sludge clarifier 120B in FIG. 3 is common to both AS stages. Further, the clarifier is provided with two segregated return AS sludge (RAS) return lines. A RAS flow with a low flow rate into the first stage results in a low mean cell residence time (MCRT) of activated sludge in the first stage, which comprises the FEB reactor 300A and the nitritation reactor 300B. By contrast, a high return flow rate of activated sludge back into the second stage, which comprises the anammox reactor 300C, results in a high MCRT for the second stage.

Flow equalization basin (FEB) reactor 300A is operated as an anoxic reactor at a very low dissolved oxygen (DO) concentration of approximately 0.00 mg/L to 0.10 mg/L to achieve carbonaceous BOD removal; conversion of organic nitrogen to ammonia nitrogen; and, denitrification of recycled nitrite or nitrate nitrogen. Nitritation reactor 300B is operated as an aerobic reactor with a slightly higher DO concentration of approximately 0.10 to 0.30 mg/L to achieve oxidation of ammonia nitrogen to nitrite nitrogen by biological nitritation.

The second stage of the two-stage AS system, which comprises anammox reactor 300C, is operated at zero DO or at a very low DO concentration of under 0.10 mg/L to achieve nitrogen removal by deammonification.

Two wastewater flows are pumped from FEB reactor 300A. The first flow 340 is pumped into nitritation reactor 300B and the second flow 350 is pumped into the influent of anammox reactor 300C, thereby bypassing the nitritation reactor. Approximately 55% of the feed forward throughput daily flow volume is pumped from FEB anoxic reactor 300A directly into the downstream anammox reactor 300C and approximately 45% of the throughput flow volume is pumped from FEB anoxic reactor into downstream nitritation reactor 300B. Partially treated wastewater 360 overflows a weir and is conducted by gravity into the downstream anammox reactor 300C. The two flows 340 and 350 pumped from the FEB reactor into the nitritation reactor and the pumped flow bypassing reactor 300B are discharged into and blended in the downstream anammox reactor. Typically a 40% to 50% wastewater flow volume, more typically a 45% wastewater flow volume, is pumped from the FEB reactor into the nitritation reactor as outflow 340. Subsequently, partially treated wastewater or sewage flows over from the nitritation reactor into the anammox reactor as overflow 360 with a similar flow rate to the outflow 340. Also typically, 50% to 60% wastewater flow volume, more typically 55% wastewater flow volume, is pumped from the nitritation reactor into the inlet of the anammox reactor as bypass flow 350. Overflow 360 and bypass flow 350 are blended in the anammox reactor.

Optionally, mixed liquor can be recycled by gravity flow from the nitritation reactor 300B back into the FEB Reactor 300A through return line 370 to achieve nitrate/nitrite removal by biological denitrification in the FEB reactor. The purpose of this optional recycle flow 370 is to prevent excess nitrite nitrogen concentration accumulation in the mixed liquor overflow from nitritation reactor 300B into anammox reactor 300C because high nitrite nitrogen concentrations can be toxic to anammox bacteria. If a recycle flow 370 is in operation, then this flow rate and volume are added to the total flow rate pumped out of the FEB Reactor in flows 340 and 350 with flow 340 being approximately 45% of the total and flow 350 being approximately 55% of the total flow.

The wastewater flow pumped from the FEB anoxic reactor contains a significantly reduced BOD concentration and a high ammonia nitrogen concentration, while the flow discharged by gravity from the aerobic nitritation reactor contains a low BOD concentration, a reduced ammonia nitrogen concentration and an increased nitrite nitrogen concentration. FEB reactor 300A is controlled and operated to provide for the growth of anoxic heterotrophic carbonaceous bacteria (AHB) to achieve substantial BOD removal, conversion of organic nitrogen (ON) to ammonia nitrogen ($NH_3$—N) and denitrification of nitrite or nitrate nitrogen recycled from nitritation reactor 300B. Further, reactor 300B is controlled and operated to provide for the growth of ammonia oxidizing bacteria (AOB) to oxidize ammonia nitrogen to nitrite nitrogen but not to nitrate nitrogen. Reactor 300B is controlled and operated to minimize the growth of nitrite oxidizing bacteria (NOB), which would oxidize nitrite to nitrate nitrogen. Thus, the treatment process goal of the nitritation reactor is to achieve nitritation (oxidation of ammonia to nitrite) and not nitrification (oxidation of ammonia to nitrate). The treatment process goal of FEB anoxic reactor 300A is to achieve BOD removal without ammonia nitrogen removal. The treatment goal of reactor 300B is to convert ammonia nitrogen to nitrite nitrogen. The treatment goal of reactor 300C is to convert a blend of ammonia nitrogen and nitrite nitrogen to nitrogen gas.

The partially treated wastewater discharged into the anammox reactor 300C is a blend of approximately 55% wastewater volume with low BOD concentration, elevated ammonia nitrogen concentration and zero or very low nitrite and nitrate nitrogen concentration, and, 45% wastewater volume with low BOD concentration, elevated nitrite nitrogen concentration and low ammonia nitrogen concentration. Choosing this ratio of ammonia nitrogen and nitrite nitrogen optimizes the growth of anammox bacteria in the anammox reactor to achieve biological deammonification of ammonia nitrogen and total nitrogen removal.

Anammox reactor 300C is typically controlled and operated with a zero or very low DO concentration of less than 0.10 mg/L. Other process parameters such as wastewater temperature, pH, etc. are controlled in the anammox reactor to maximize the quantity and accumulation of anammox bacteria therein.

Mixed liquor flows over from the anammox reactor into either a downstream final clarifier or into one or more downstream polishing reactors 310 for nitrification and denitrification of any residual ammonia nitrogen and/or nitrate nitrogen in the anammox reactor effluent before flowing into the final clarifier.

Two separate RAS recycle flows are pumped from the final clarifier 120B shown in FIG. 3 or clarifiers 120B connected in parallel shown in FIG. 4. The first RAS flow 320 is pumped from the clarifier back into FEB reactor 300A and/or into nitritation reactor 300B. Accordingly, FEB reactor 300A and nitritation reactor 300B are operated as a first stage low MCRT activated sludge treatment system. The second RAS flow 330 is pumped from the clarifier into the anammox reactor 300C, which is operated as a second stage high MCRT activated sludge treatment system.

To achieve operating conditions with a low MCRT for the first AS stage, typically of from 2 to 5 days, a low RAS flow pumping rate is provided for recycling activated sludge from the final clarifier back into the FEB reactor and/or the nitritation reactor. By contrast, the second AS stage is operated with a high MCRT, typically 50 days. Therefore, the RAS return flow to anammox reactor 300C is provided with a high RAS flow pumping rate. In this manner, the segregated low and high RAS rates can be used to recycle most of the settled mixed liquor biomass solids from the clarifier into the anammox reactor with a low amount of settled biomass solids recycled from the clarifier into FEB reactor 300A or nitritation reactor 300B. This segregated RAS process results in a low MLSS concentration of about 500 mg/L to 1,500 mg/L being maintained in the first AS stage and a high MLSS concentration of about 2,000 mg/L to 6,000 mg/L being maintained in the second AS stage.

If the anammox reactor effluent still contains ammonia nitrogen, TKN, nitrite or nitrate nitrogen concentrations that must be further treated, for example to meet permit levels, then the anammox reactor effluent mixed liquor effluent flows over into downstream nitrification and denitrification polishing reactors 310 prior to flowing into the final clarifier or into the final clarifiers. In the system in FIG. 5, two polishing reactors 310 are connected in series, wherein the first polishing reactor is a nitrification polishing reactor and the second polishing reactor is a denitrification polishing reactor.

Uniquely to the system and method disclosed in FIGS. 1 and 2, the equalization reactor 100A is also operated to accurately divide the partially treated reactor effluent mixed liquor into a first flow portion $Q_2$, which is pumped constantly into the downstream second stage aerobic nitritation reactor, and a second flow portion $Q_1$, which by-passes the second stage aerobic reactor, and, is pumped constantly into a first stage clarifier 120A. A first portion flow rate $Q_2$ of approximately 40% to 50%, in particular 45%, of the total average daily influent wastewater flow volume or flow rate of sewage or wastewater plus sludge treatment supernatant and filtrate, plus the RAS flow rate, plus the nitrite recycle flow rate is constantly pumped from the EQ reactor into the downstream second stage aerobic nitritation reactor 100B for treatment by anammox bacteria. A second portion flow rate $Q_1$ of approximately 50% to 60%, in particular 55%, of the total average daily influent wastewater flow volume plus recycle flow is pumped from the equalization reactor directly into the first stage clarifier influent mixed liquor flow, thereby by-passing the second stage aerobic nitritation reactor 100B.

Using this equalization reactor effluent flow splitting process, the clarified and partially treated influent wastewater that flows into the third stage reactor 110 is a mixture of an approximately 45% first portion wastewater flow with reduced ammonia concentration, increased nitrite nitrogen concentration, low nitrate nitrogen concentration, and further reduced carbonaceous BOD concentration; and, an approximately 55% second portion wastewater flow portion with high influent ammonia concentration, low nitrite and nitrate concentration, and reduced carbonaceous BOD concentration.

The first stage clarifier effluent is a blend of partially treated wastewater that has a low BOD concentration, increased nitrite nitrogen concentration, and reduced ammonia nitrogen concentration. The BOD, ammonia nitrogen, and nitrite nitrogen concentrations in the first stage clarifier effluent are controlled by the operation of the equalization reactor process flow splitting method plus nitrite recycle flow 105 from the downstream nitritation reactor back into the equalization reactor 100A. The concentrations of BOD, ammonia nitrogen, and nitrite nitrogen in the blended first stage clarifier effluent are controlled to promote and optimize the growth and accumulation of anaerobic, autotrophic ammonia oxidizing anammox biomass in the third stage anammox reactor 110 in which these autotrophic bacteria will use nitrite nitrogen as an inorganic food substrate to convert nitrite nitrogen to nitrogen gas. In a particular embodiment, the process is conducted without supplemental carbon source dosage 190.

In the three stage activated sludge process with intermediate (first stage) and final (second stage) clarification steps, the first stage equalization reactor is typically operated at zero dissolved oxygen (DO) concentration; the second stage aerobic reactor at low DO concentration of approximately 0.20 mg/L; and the third stage anammox reactor at low DO concentration of 0.0 to 0.20 mg/L. Biomass solids that are produced in the first and second stage reactors are settled in the first stage clarifier(s) and recycled by pumping back into the first stage equalization reactor or optionally into the second stage aerobic nitritation reactor 100B. Biomass solids that are produced in the third stage reactor 110 are settled in the second stage clarifier 120B and recycled by pumping the solids back into the third stage reactor 110. Thereby, separate biomass sludges each having a different and independent Sludge Retention Time (SRT) and mean cell residence time (MCRT) can be produced and maintained in the first and second stage reactor-clarifier system vs. the third stage reactor-clarifier system.

Maintaining independent SRT and MCRT control in the first and second stage reactor-clarifier system, and the third stage reactor-clarifier system, allows for producing, maintaining, and controlling the growth and population of anaerobic autotrophic ammonia oxidizing anammox bacteria, which accomplish the deammonification process in the third stage anammox reactor 110. The deammonification process involves two process steps including the nitritation of ammonia by aerobic AOB in the first and second stage reactor-clarifier system followed by the anaerobic oxidation of residual ammonia to nitrogen gas by anaerobic AOB in the third stage reactor-clarifier system.

Specifically, the two process steps can be represented by the following reaction equations:

$$2\ NH_4^+ + 3\ O_2 \rightarrow 2\ NO_2^- + 4\ H^+ + 2\ H_2O, \quad \text{(I) and}$$

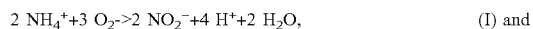

$$NH_4^+ + NO_2^- \rightarrow N_2 + 2\ H_2O. \quad \text{(II)}$$

This deammonification process significantly reduces the operating costs for oxygen transfer power and for supplemental carbon source chemical dosage required to achieve total nitrogen removal.

Short SRT and MCRT times of about 1 to 4 days, in particular approximately 3 days, are preferred for the growth of anoxic heterotrophic biomass (AHB) and aerobic (AOB) to achieve BOD removal and nitritation in the first and second stage reactor-clarifier system, while much longer SRT and MCRT times of about 40 to 60 days, in particular approximately 50 days, are preferred for the growth of anaerobic, anammox AOB to achieve nitrite and ammonia removal in the third stage reactor-clarifier system.

An average nitrite recycle (NiR) flow rate 105 of 200% to 400% of the average daily flow (ADF) is provided from nitritation reactor 100B back into equalization reactor 100A, which removes approximately 80% of any nitrate nitrogen unintentionally produced in nitritation reactor 100B via denitrification by AHB in flow equalization reactor 100A. The NiR also recycles approximately 80% of the nitrite nitrogen intentionally produced in nitritation reactor 100B, which is also removed via denitrification by AHB in equalization reactor 100A and thereby assists in preventing nitrite accumulation in nitritation reactor 100B because nitrite is a toxic compound for anammox bacteria when present in excess.

An optional sludge recycle line (RAS$_4$) can be supplied for clarifier 120A to provide the capability of very accurately controlling the feed rate of AHB, which is contained in clarifier 120A mixed liquor underfloor, into the anammox reactor 110 influent flow. Thereby, additional nitrite or nitrate nitrogen removal by denitrification in anammox reactor 110 is made possible. In particular, the RAS$_4$ flow into anammox reactor 110 can be used to achieve additional denitrification by AHB in anammox reactor 110, if desired for the total nitrite or nitrate removal, without over-populating the mixed liquor maintained in anammox reactor 110 with AHB and causing AHB to outcompete the anammox organisms.

Surface aeration can be optionally used in nitritation reactor 100B to reduce the mixed liquor temperature and thereby repress nitrite oxidizing biomass (NOB) in the nitritation reactor.

The disclosed process uses a flow equalization reactor in a multi-stage activated sludge process in which an anammox biomass population is maintained in a third stage reactor-clarifier system to achieve biological nitrogen removal with significantly reduced process requirements for oxygen transfer and supplemental carbon source chemical dosage.

The embodiments described hereinabove are further intended to explain best modes known of practicing the disclosure and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. A process for treating wastewater or sewage comprising:
   receiving a wastewater inflow or a sewage inflow in a flow equalization reactor;
   receiving an outflow from the flow equalization reactor in a nitritation reactor;
   receiving an overflow of partially treated wastewater or partially treated sewage from the nitritation reactor in an anammox reactor;
   receiving a bypass flow from the flow equalization reactor in the anammox reactor;
   receiving a mixed liquor flow from the anammox reactor in a clarifier;
   providing a first return activated sludge flow from the clarifier to the flow equalization reactor, the nitritation reactor or to the flow equalization reactor and to the nitritation reactor; and,
   providing a second return activated sludge flow from the clarifier to the anammox reactor.

2. The process according to claim 1, further comprising: receiving the mixed liquor flow from the anammox reactor in a plurality of clarifiers connected in parallel.

3. The process according to claim 1, further comprising:
blending the overflow from the nitritation reactor and the bypass flow from the flow equalization reactor in the anammox reactor.

4. The process according to claim 1, further comprising:
adjusting a mean cell residence time (MCRT) of the flow equalization reactor, the nitritation reactor or the equalization reactor and the nitritation reactor to be of from 2 to 5 days.

5. The process according to claim 1, further comprising:
adjusting the MCRT of the anammox reactor to be of from 40 to 60 days.

6. The process according to claim 5, wherein the MCRT of the anammox reactor is adjusted to be approximately 50 days.

7. The process according to claim 1, further comprising:
receiving the outflow from the flow equalization reactor in the nitritation reactor with an average flow rate of from 40% to 50% of an average daily feed forward flow rate.

8. The process according to claim 7,
wherein the average daily flow rate of the outflow is 45% of the average daily feed forward flow rate.

9. The process according to claim 1, further comprising:
receiving the bypass flow from the flow equalization reactor in the annamox reactor with an average flow rate of from 50% to 60% of an average daily feed forward flow rate.

10. The process according to claim 9,
wherein the average daily flow rate of the bypass flow is 55% of the average daily feed forward flow rate.

11. The process according to claim 1, further comprising:
operating the equalization reactor with a dissolved oxygen concentration of approximately 0.0 mg/L to 0.10 mg/L.

12. The process according to claim 1, further comprising:
operating the nitritation reactor with a dissolved oxygen concentration of approximately 0.10 mg/L to 0.30 mg/L.

13. The process according to claim 1, further comprising:
operating the anammox reactor with a dissolved oxygen concentration of approximately 0.0 mg/L to 0.10 mg/L.

14. The process according to claim 1, further comprising:
providing at least one polishing reactor between the annamox reactor and the clarifier.

15. The process according to claim 14, further comprising:
providing a plurality of polishing reactors connected in series.

16. The process according to claim 14, wherein the at least one polishing reactor removes residual ammonia from the mixed liquor flow by nitrification.

17. The process according to claim 14, wherein the at least one polishing reactor removes residual nitrate nitrogen from the mixed liquor flow by denitrification.

18. The process according to claim 1 wherein a flow rate of the second return activated sludge flow is greater than a flow rate of the first return activated sludge flow.

19. The process according to claim 1, wherein a concentration of mixed liquor suspended solids (MLSS) in the flow equalization reactor, the nitritation reactor or in the flow equalization reactor and the nitritation reactor is of from 500 mg/L to 1,500 mg/L.

20. The process according to claim 1, wherein a concentration of mixed liquor suspended solids (MLSS) in the anammox reactor is of from 2,000 mg/L to 6,000 mg/L.

* * * * *

UNITED STATES PATENT AND TRADEMARK OFFICE
CERTIFICATE OF CORRECTION

PATENT NO.         : 9,656,897 B2                              Page 1 of 1
APPLICATION NO.    : 14/642369
DATED              : May 23, 2017
INVENTOR(S)        : Reid It is certified that error appears in the above-identified patent and that said Letters Patent is hereby corrected as shown below:

In the Specification

In Column 9:
Line 61: delete "underfloor" and insert -- underflow -- therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*